(12) United States Patent
Castinado et al.

(10) Patent No.: US 10,127,400 B2
(45) Date of Patent: *Nov. 13, 2018

(54) CONTROL DEVICE FOR AGGREGATION AND DISTRIBUTION OF MACHINE-INITIATED RESOURCE DISTRIBUTION

(71) Applicant: BANK OF AMERICA CORPORATION, Charlotte, NC (US)

(72) Inventors: Joseph Benjamin Castinado, North Glenn, CO (US); Stephen A. Corrado, Marvin, NC (US); Victoria L. Dravneek, Charlotte, NC (US); Manu Jacob Kurian, Dallas, TX (US); Phillip Wade Mork, Huntersville, NC (US); Evan Sachs, New York, NY (US); Alicia C. Jones-McFadden, Fort Mill, SC (US); Matthew Hsieh, Charlotte, NC (US); Michael Emil Ogrinz, Easton, CT (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 163 days.

This patent is subject to a terminal disclaimer.

(21) Appl. No.: 15/276,419

(22) Filed: Sep. 26, 2016

(65) Prior Publication Data
US 2018/0089455 A1    Mar. 29, 2018

(51) Int. Cl.
*H04L 29/06* (2006.01)
*G06F 21/62* (2013.01)

(52) U.S. Cl.
CPC ................. *G06F 21/6218* (2013.01)

(58) Field of Classification Search
CPC .................................... G06F 21/6218
See application file for complete search history.

(56) References Cited

U.S. PATENT DOCUMENTS 5,717,923 A    2/1998 Dedrick
5,761,648 A    6/1998 Golden et al.
(Continued)

FOREIGN PATENT DOCUMENTS

CN    104283967 A    1/2015

OTHER PUBLICATIONS

Friedman, Jack P., Dictionary of Business Terms, 2000, Barron's Educational Series, Inc., 3rd edition, 225.
(Continued)

*Primary Examiner* — Ghodrat Jamshidi
(74) *Attorney, Agent, or Firm* — Michael A. Springs; Moore & Van Allen PLLC; Nicholas C. Russell

(57) ABSTRACT

Embodiments of the invention are directed to a control device for aggregation of machine-initiated resource distribution. The invention is a control device that links user associated smart devices. The control device generates code to extract data from the smart devices and control the communications disseminated from and received by the smart device from third parties. In this way, the control device prevents smart devices from communicating with third party systems and from third party systems from communicating directly with the smart devices. Thus, fixing the technical challenges within a current network including the need to consolidate and aggregate data across smart devices associated with the user, the need to control and manage the flow of data packets from smart devices to third parties (privacy, filtering, protection), and the need to easily track and refresh an inventory of smart devices.

20 Claims, 7 Drawing Sheets

(56) References Cited

U.S. PATENT DOCUMENTS

| | | |
|---|---|---|
| 5,842,185 A | 11/1998 | Chancey et al. |
| 5,848,396 A | 12/1998 | Gerace |
| 5,870,770 A | 2/1999 | Wolfe |
| 5,907,830 A | 5/1999 | Engel et al. |
| 5,911,135 A | 6/1999 | Atkins |
| 5,933,811 A | 8/1999 | Angles et al. |
| 6,006,252 A | 12/1999 | Wolfe |
| 6,009,411 A | 12/1999 | Kepecs |
| 6,009,413 A | 12/1999 | Webber et al. |
| 6,041,309 A | 3/2000 | Laor |
| 6,055,573 A | 4/2000 | Gardenswartz et al. |
| 6,076,069 A | 6/2000 | Laor |
| 6,223,163 B1 | 4/2001 | Van Luchene |
| 6,263,351 B1 | 7/2001 | Wolfe |
| 6,282,567 B1 | 8/2001 | Finch, II et al. |
| 6,292,786 B1 | 9/2001 | Deaton et al. |
| 6,292,813 B1 | 9/2001 | Wolfe |
| 6,317,718 B1 | 11/2001 | Fano |
| 6,321,208 B1 | 11/2001 | Barnett et al. |
| 6,330,543 B1 | 12/2001 | Kepecs |
| 6,332,126 B1 | 12/2001 | Peirce et al. |
| 6,336,099 B1 | 1/2002 | Barnett et al. |
| 6,336,131 B1 | 1/2002 | Wolfe |
| 6,341,305 B2 | 1/2002 | Wolfe |
| 6,349,290 B1 | 2/2002 | Horowitz et al. |
| 6,385,592 B1 | 5/2002 | Angles et al. |
| 6,434,534 B1 | 8/2002 | Walker et al. |
| 6,505,168 B1 | 1/2003 | Rothman et al. |
| 6,611,814 B1 | 8/2003 | Lee et al. |
| 6,615,184 B1 | 9/2003 | Hicks |
| 6,622,174 B1 | 9/2003 | Ukita et al. |
| 6,678,685 B2 | 1/2004 | McGill et al. |
| 6,782,370 B1 | 8/2004 | Stack |
| 6,853,291 B1 | 2/2005 | Aisa |
| 6,865,545 B1 | 3/2005 | Epstein et al. |
| 6,906,617 B1 | 6/2005 | Van der Meulen |
| 6,925,444 B1 | 8/2005 | McCollom et al. |
| 6,937,995 B1 | 8/2005 | Kepecs |
| 7,024,374 B1 | 4/2006 | Day et al. |
| 7,043,526 B1 | 5/2006 | Wolfe |
| 7,096,193 B1 | 8/2006 | Beaudoin et al. |
| 7,099,832 B2 | 8/2006 | Walker et al. |
| 7,124,096 B2 | 10/2006 | Dutta et al. |
| 7,127,414 B1 | 10/2006 | Awadallah et al. |
| 7,162,443 B1 | 1/2007 | Shah |
| 7,181,488 B2 | 2/2007 | Martin et al. |
| 7,225,167 B2 | 5/2007 | Hind et al. |
| 7,231,357 B1 | 6/2007 | Shanman et al. |
| 7,236,942 B1 | 6/2007 | Walker et al. |
| 7,246,310 B1 | 7/2007 | Wolfe |
| 7,249,058 B2 | 7/2007 | Kim et al. |
| 7,254,548 B1 | 8/2007 | Tannenbaum |
| 7,257,604 B1 | 8/2007 | Wolfe |
| 7,299,007 B2 | 11/2007 | Eskin |
| 7,302,429 B1 | 11/2007 | Wanker |
| 7,302,638 B1 | 11/2007 | Wolfe |
| 7,315,834 B2 | 1/2008 | Martineau et al. |
| 7,324,965 B2 | 1/2008 | Martineau et al. |
| 7,340,419 B2 | 3/2008 | Walker et al. |
| 7,356,490 B1 | 4/2008 | Jacobi et al. |
| 7,386,477 B2 | 6/2008 | Fano |
| 7,398,248 B2 | 7/2008 | Phillips et al. |
| 7,412,604 B1 | 8/2008 | Doyle |
| 7,433,874 B1 | 10/2008 | Wolfe |
| 7,464,050 B1 | 12/2008 | Deaton et al. |
| 7,472,088 B2 | 12/2008 | Taylor et al. |
| 7,490,056 B2 | 2/2009 | Nash |
| 7,512,551 B2 | 3/2009 | Postrel |
| 7,536,385 B1 | 5/2009 | Wolfe |
| 7,552,080 B1 | 6/2009 | Willard et al. |
| 7,578,435 B2 | 8/2009 | Suk |
| 7,593,862 B2 | 9/2009 | Mankoff |
| 7,599,850 B1 | 10/2009 | Laor |
| 7,606,736 B2 | 10/2009 | Martineau et al. |
| 7,860,792 B1 | 12/2010 | Magruder et al. |
| 7,925,579 B1 | 4/2011 | Flaxman et al. |
| 8,042,178 B1 | 10/2011 | Fisher et al. |
| 8,234,194 B2 | 7/2012 | Mele et al. |
| 8,301,558 B2 | 10/2012 | Marshall et al. |
| 8,442,894 B2 | 5/2013 | Blackhurst et al. |
| 8,495,072 B1 | 7/2013 | Kapoor et al. |
| 8,930,265 B2 | 1/2015 | Blackhurst et al. |
| 8,984,113 B2 | 3/2015 | Li et al. |
| 9,009,828 B1 | 4/2015 | Ramsey et al. |
| 9,032,077 B1 | 5/2015 | Klein et al. |
| 9,043,879 B1 | 5/2015 | Reeves et al. |
| 9,104,189 B2 | 8/2015 | Berges Gonzalez et al. |
| 9,106,615 B2 | 8/2015 | Grossman |
| 9,338,181 B1 | 5/2016 | Burns et al. |
| 9,411,982 B1 | 8/2016 | Dippenaar et al. |
| 9,743,272 B1 | 8/2017 | Ogrinz et al. |
| 9,775,131 B2 | 9/2017 | Winand et al. |
| 9,843,624 B1 | 12/2017 | Taaghol et al. |
| 9,874,923 B1 | 1/2018 | Brown et al. |
| 9,946,571 B1 | 4/2018 | Brown et al. |
| 2002/0032626 A1 | 3/2002 | DeWolf et al. |
| 2002/0049624 A1 | 4/2002 | Ravels, Jr. |
| 2002/0052803 A1 | 5/2002 | Amidhozour et al. |
| 2002/0062249 A1 | 5/2002 | Iannacci |
| 2002/0072975 A1 | 6/2002 | Steele et al. |
| 2002/0091571 A1 | 7/2002 | Thomas et al. |
| 2002/0114433 A1 | 8/2002 | Katou et al. |
| 2002/0143564 A1 | 10/2002 | Webb et al. |
| 2002/0190118 A1 | 12/2002 | Davenport et al. |
| 2004/0122736 A1 | 6/2004 | Stock et al. |
| 2004/0192339 A1 | 9/2004 | Wilson et al. |
| 2004/0226995 A1 | 11/2004 | Smith |
| 2004/0230593 A1 | 11/2004 | Rudin et al. |
| 2004/0249768 A1 | 12/2004 | Kontio et al. |
| 2005/0015624 A1 | 1/2005 | Ginter et al. |
| 2005/0039053 A1 | 2/2005 | Walia |
| 2005/0075975 A1 | 4/2005 | Rosner et al. |
| 2005/0171845 A1 | 8/2005 | Hallman et al. |
| 2005/0173517 A1 | 8/2005 | Suk et al. |
| 2005/0177437 A1 | 8/2005 | Ferrier |
| 2005/0221842 A1 | 10/2005 | Kaneko et al. |
| 2005/0286079 A1 | 12/2005 | Takagi |
| 2005/0288955 A1 | 12/2005 | Lewiss-Hachmeister |
| 2006/0151598 A1 | 7/2006 | Chen et al. |
| 2006/0217113 A1 | 9/2006 | Rao et al. |
| 2007/0005426 A1 | 1/2007 | Walker et al. |
| 2007/0092114 A1 | 4/2007 | Ritter et al. |
| 2007/0127470 A1* | 6/2007 | Gaedeken ............ H04L 12/2803 370/389 |
| 2007/0136418 A1 | 6/2007 | Wolfe |
| 2007/0255620 A1 | 11/2007 | Tumminaro et al. |
| 2007/0260532 A1 | 11/2007 | Blake, III |
| 2007/0299677 A1 | 12/2007 | Maertz |
| 2008/0009268 A1 | 1/2008 | Ramer et al. |
| 2008/0021767 A1 | 1/2008 | Benson et al. |
| 2008/0040417 A1 | 2/2008 | Juncker |
| 2008/0091535 A1 | 4/2008 | Heiser, II et al. |
| 2008/0133336 A1 | 6/2008 | Altman et al. |
| 2008/0162224 A1 | 7/2008 | Coon et al. |
| 2008/0162316 A1 | 7/2008 | Rampell et al. |
| 2008/0192677 A1 | 8/2008 | Abusch-Magder et al. |
| 2008/0221986 A1 | 9/2008 | Soicher et al. |
| 2008/0228600 A1 | 9/2008 | Treyz et al. |
| 2008/0235130 A1 | 9/2008 | Malov et al. |
| 2008/0249936 A1 | 10/2008 | Miller et al. |
| 2008/0249941 A1 | 10/2008 | Cooper |
| 2008/0277465 A1 | 11/2008 | Pletz et al. |
| 2008/0301779 A1 | 12/2008 | Garg et al. |
| 2009/0006175 A1 | 1/2009 | Maertz |
| 2009/0043629 A1 | 2/2009 | Price |
| 2009/0094125 A1 | 4/2009 | Killian et al. |
| 2009/0132366 A1 | 5/2009 | Lam et al. |
| 2009/0132415 A1 | 5/2009 | Davis et al. |
| 2009/0150238 A1 | 6/2009 | Marsh et al. |
| 2009/0170483 A1 | 7/2009 | Barnett et al. |
| 2009/0172728 A1 | 7/2009 | Shkedi et al. |
| 2009/0187436 A1 | 7/2009 | Shoen et al. |
| 2009/0187543 A1 | 7/2009 | Samborn |
| 2009/0271265 A1 | 10/2009 | Lay et al. |

(56) References Cited

U.S. PATENT DOCUMENTS

| | | |
|---|---|---|
| 2009/0292599 A1 | 11/2009 | Rampell et al. |
| 2009/0292647 A1 | 11/2009 | Porat et al. |
| 2009/0299865 A1 | 12/2009 | Budgen |
| 2009/0313106 A1 | 12/2009 | Taylor et al. |
| 2009/0319638 A1 | 12/2009 | Faith et al. |
| 2010/0106568 A1 | 4/2010 | Grimes |
| 2010/0131395 A1 | 5/2010 | Allin et al. |
| 2010/0189227 A1 | 7/2010 | Mannar et al. |
| 2010/0250538 A1 | 9/2010 | Richards et al. |
| 2010/0274731 A1 | 10/2010 | Tsitsis |
| 2010/0306763 A1 | 12/2010 | Lambert et al. |
| 2011/0040785 A1 | 2/2011 | Steenberg et al. |
| 2011/0087547 A1 | 4/2011 | Amaro et al. |
| 2011/0182280 A1* | 7/2011 | Charbit ............ H04W 56/0045 370/350 |
| 2011/0191149 A1 | 8/2011 | Blackhurst et al. |
| 2011/0191150 A1 | 8/2011 | Blackhurst et al. |
| 2011/0191160 A1 | 8/2011 | Blackhurst et al. |
| 2011/0191173 A1 | 8/2011 | Blackhurst et al. |
| 2011/0191177 A1 | 8/2011 | Blackhurst et al. |
| 2011/0191180 A1 | 8/2011 | Blackhurst et al. |
| 2011/0191181 A1 | 8/2011 | Blackhurst et al. |
| 2011/0191184 A1 | 8/2011 | Blackhurst et al. |
| 2011/0191238 A1 | 8/2011 | Blackhurst et al. |
| 2011/0238499 A1 | 9/2011 | Blackhurst et al. |
| 2011/0238550 A1 | 9/2011 | Reich et al. |
| 2011/0270773 A1 | 11/2011 | Siekman et al. |
| 2011/0302201 A1 | 12/2011 | Ogaz et al. |
| 2012/0016803 A1 | 1/2012 | Tharp |
| 2012/0028635 A1 | 2/2012 | Borg et al. |
| 2012/0030092 A1 | 2/2012 | Marshall et al. |
| 2012/0190386 A1 | 7/2012 | Anderson |
| 2012/0290230 A1 | 11/2012 | Berges Gonzalez et al. |
| 2013/0006813 A1 | 1/2013 | Carlin et al. |
| 2013/0046626 A1 | 2/2013 | Grigg et al. |
| 2013/0079931 A1 | 3/2013 | Wanchoo et al. |
| 2013/0096857 A1 | 4/2013 | Chakradhar |
| 2013/0110621 A1 | 5/2013 | Gupta et al. |
| 2013/0132854 A1* | 5/2013 | Raleigh ................ G06F 3/0482 715/738 |
| 2013/0185558 A1 | 7/2013 | Seibert et al. |
| 2013/0298242 A1 | 11/2013 | Kumar et al. |
| 2013/0307702 A1 | 11/2013 | Pal et al. |
| 2014/0006529 A1 | 1/2014 | Andreoli-Fang et al. |
| 2014/0047322 A1 | 2/2014 | Kim et al. |
| 2014/0068721 A1 | 3/2014 | Ong et al. |
| 2014/0115324 A1 | 4/2014 | Buer |
| 2014/0226010 A1* | 8/2014 | Molin .................... G06Q 10/06 348/148 |
| 2014/0244834 A1 | 8/2014 | Guedalia et al. |
| 2014/0278629 A1 | 9/2014 | Stephenson et al. |
| 2014/0344128 A1 | 11/2014 | Nikankin et al. |
| 2015/0002271 A1 | 1/2015 | Lee et al. |
| 2015/0013001 A1 | 1/2015 | Lee et al. |
| 2015/0081860 A1 | 3/2015 | Kuehnel et al. |
| 2015/0094026 A1 | 4/2015 | Martin |
| 2015/0094093 A1 | 4/2015 | Pierce et al. |
| 2015/0095478 A1 | 4/2015 | Zuerner |
| 2015/0227406 A1 | 8/2015 | Jan et al. |
| 2015/0293574 A1* | 10/2015 | Ehsan ................... G06F 1/3206 713/322 |
| 2015/0294553 A1 | 10/2015 | Logan et al. |
| 2015/0312348 A1 | 10/2015 | Lustgarten |
| 2015/0327071 A1 | 11/2015 | Sharma et al. |
| 2015/0358317 A1 | 12/2015 | Deutschmann et al. |
| 2016/0065628 A1 | 3/2016 | Guo et al. |
| 2016/0071334 A1 | 3/2016 | Johnson et al. |
| 2016/0087933 A1 | 3/2016 | Johnson et al. |
| 2016/0132832 A1 | 5/2016 | Pinkovezky et al. |
| 2016/0164919 A1 | 6/2016 | Satish et al. |
| 2016/0210450 A1 | 7/2016 | Su |
| 2016/0217282 A1 | 7/2016 | Vecera et al. |
| 2016/0232336 A1 | 8/2016 | Pitschel et al. |
| 2016/0269411 A1 | 9/2016 | Malachi |
| 2016/0295410 A1 | 10/2016 | Gupta et al. |
| 2016/0300201 A1 | 10/2016 | Li et al. |
| 2016/0337869 A1* | 11/2016 | Dai .................... H04W 74/085 |
| 2016/0342982 A1 | 11/2016 | Thomas et al. |
| 2016/0367415 A1 | 12/2016 | Hayes et al. |
| 2017/0004508 A1 | 1/2017 | Mansfield et al. |
| 2017/0006135 A1 | 1/2017 | Siebel et al. |
| 2017/0017354 A1 | 1/2017 | Wei |
| 2017/0041296 A1 | 2/2017 | Ford et al. |
| 2017/0061442 A1 | 3/2017 | Barlow et al. |
| 2017/0076408 A1 | 3/2017 | DSouza et al. |
| 2017/0124642 A1 | 5/2017 | Barnett et al. |
| 2017/0171513 A1 | 6/2017 | Nakamura |
| 2017/0178186 A1 | 6/2017 | Craft |
| 2017/0208079 A1 | 7/2017 | Cammarota et al. |
| 2017/0208139 A1 | 7/2017 | Li et al. |
| 2017/0228773 A1 | 8/2017 | Takayama |
| 2017/0235454 A1 | 8/2017 | Selfridge et al. |
| 2017/0244618 A1 | 8/2017 | DeLuca et al. |
| 2017/0278133 A1 | 9/2017 | Corrado et al. |
| 2017/0280459 A1 | 9/2017 | Ogrinz |
| 2017/0302669 A1 | 10/2017 | Chen et al. |
| 2017/0323345 A1 | 11/2017 | Flowers et al. |
| 2017/0352071 A1 | 12/2017 | Carey et al. |
| 2017/0353859 A1 | 12/2017 | Idnani et al. |
| 2017/0366422 A1 | 12/2017 | Castinado et al. |
| 2017/0374583 A1 | 12/2017 | Ogrinz et al. |
| 2018/0007131 A1 | 1/2018 | Cohn et al. |

OTHER PUBLICATIONS

Guagliardo, Joseph C. et al., "Blockchain: Preparing for Disruption Like Its the 90s"; Mar. 14, 2016, retrieved from http://www.law360.com/articles/77120CVprint?section=ip.

International Preliminary Report on Patentability (IPRP) dated Jul. 31, 2012 for International Application No. PCT/US2011/022765.

International Search Report and the Written Opinion of the International Searching Authority dated Mar. 25, 2011 for International Application No. PCT/US11/22781.

International Search Report and the Written Opinion of the International Searching Authority dated Mar. 25, 2011 for International Application No. PCT/US11/22783.

International Search Report and the Written Opinion of the International Searching Authority dated Mar. 28, 2011 for International Application No. PCT/US11/22771.

International Search Report and the Written Opinion of the International Searching Authority dated Mar. 29, 2011 for International Application No. PCT/US11/22779.

International Search Report and the Written Opinion of the International Searching Authority dated Mar. 29, 2011 for International Application No. PCT/US11/22785.

International Search Report and the Written Opinion of the International Searching Authority dated Apr. 8, 2011 for International Application No. PCT/US11/22765.

* cited by examiner

CONTROL DEVICE FOR AGGREGATION AND DISTRIBUTION OF MACHINE-INITIATED RESOURCE DISTRIBUTION

BACKGROUND

With advancements in machine and product development, more and more machines and products are being interconnected via internet channels. The expansion of the internet-of-things to encompass smart systems and devices in home, industrial, and other business contexts raise technical challenges including the need to consolidate and aggregate data across devices associated with the user, the need to control and manage the flow of information from devices to third parties (privacy, filtering, protection), and the need to easily track and refresh a user's inventory of smart devices in a manner that allows key data to remain associated with the user while the user's inventory, device associations, and personal/business associations change over time.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an intermediary control device for aggregation of machine-initiated resource distribution. Thus fixing the technical challenges within the current network including the need to consolidate and aggregate data across devices associated with the user, the need to control and manage the flow of information from devices to third parties (privacy, filtering, protection), and the need to easily track and refresh a user's inventory of smart devices in a manner that allows key data to remain associated with the user while the user's inventory, device associations, and personal/business associations change over time.

The intermediary control device receives or picks-up all data transmitted from smart devices within a home or business and distributes the data transmitted to a portal for controlling and managing the flow of information from the smart devices to third parties. The intermediary can receive all data being transmitted from the smart devices within the home. Thus, even if a Wi-Fi or mobile device authenticated for that smart device is not active, the intermediary control device will be able to receive the data transmitted. The intermediary control device is configured as a disruptor of data, thus preventing data from being transmitted to third parties from the smart device. The intermediary control device may generate a private network for the data transmission from the smart devices, while still allowing a user to control and manage the data that does get pushed to a third party, via a mobile device. The intermediary control device may be a stand-alone device, a wearable device, or the like.

In some embodiments, the intermediary control device may control the network and the transmitting and/or accounts associated with resources across the network via an interface.

In some embodiments, the control device may identify the proprietary protocols for each brand of smart device and create a standard for the communication with the smart devices. In this way, the control device may be a proxy layer between the different smart device application program interfaces.

The expansion of smart devices to encompass systems and devices in home, industrial, and other business contexts raise technical challenges that the invention system is capable of addressing. This technical challenges that the system alleviates includes: (1) the need to consolidate and aggregate data across devices associated with the user; (2) the need to control and manage the flow of information from devices to third parties (privacy, filtering, protection); and (3) the need to easily track and refresh a user's inventory of smart devices in a manner that allows key data to remain associated with the user while the user's inventory, device associations, and personal/business associations change over time.

In some embodiments, the technical challenges are solved by the intermediary control device that can communicate through a generated interactive portal. The portal may be associated with a trusted entity or financial institution. In this way, as a trusted technology partner, the system can generate a portal and associated interfaces available to a user such that the user can identify and register smart devices, manage passwords, identify and implement user preferences for privacy and identify third parties with whom data can be shared and with whom financial transactions may be performed.

Specific use examples include developing an automation of traditionally human intensive tasks, such as warranty registration and service. In an example embodiment, an owner of a smart device registers the device with the portal, which in turn transmits the information necessary to register a warranty with the manufacturer of the device. When the device transmits data associated with a failure of the device, the portal allows for the user to be notified of the warranty status of the device and/or initiates service of the device covered by the warranty.

In some embodiments, the intermediary control device may selective release of data to different third parties. Similarly, devices registered with the intermediary control device can be added to insurance company records, such that when a device is lost or stolen, the device can be recovered and/or an insurance claim can be initiated and paid. The data compilation, aggregation, and correlation made possible by the portal also permits the financial institution to package and market packaged data to third parties, and to acquire data that may not be available to or from public utilities and other entities with information needs. The system also allows a user to authenticate devices to them and authenticate service providers to create authenticated communication and payment channels.

Embodiments of the invention relate to a control device, which includes systems, methods, and computer program products for aggregation and distribution of machine-initiated resources, the control device configured for: identifying one or more smart device systems associated with the user; generating, via the control device, a communicable linkage with the one or more smart device systems associated with the user; blocking, via the control device, external communication to or from the one or more smart device systems via networks other than the generated communicable linkage; uplinking the one or more smart device systems to the control device and store the one or more smart device systems information; allowing management of the one or more smart device systems from an interface associated with the control device; identifying the triggering event occurring, wherein the triggering event is a predetermined event inputted at the interface by the user or control device identified; and selective releasing data from the control device regarding one or more smart device systems to one or more third party systems based on the triggering event occurrence.

In some embodiments, blocking, via the control device, external communication to or from the one or more smart device systems via networks other than the generated communicable linkage further comprises transmitting data packets to the one or more smart device systems and store the data packets on the one or more smart device systems, wherein the data packet includes code preventing communication transmissions from the one or more smart device systems to third party systems.

In some embodiments, allowing management of the one or more smart device systems from an interface associated with the control device further comprises the interface being associated with the housing of the control device or the interface being presented via a network to a user device.

In some embodiments, identifying one or more smart device systems associated with the user further comprises identifying one or more smart devices within a same building or room as the control device by identifying a geographic location of the project using GPS and identifying transmitting signals associated with smart device systems from within the geographic location.

In some embodiments, the triggering event is identified based on a communication from the one or more smart device systems to the control device identifying a maintenance or material requirement for the product associated with the one or more smart device systems.

In some embodiments, the third party is a materials provider, maintenance provider, insurance provider, or warrantee provider providing service to the product associated with the one or more smart device systems.

In some embodiments, the one or more smart device systems further comprise products or machinery with transmitting signals associated with the product or machinery capable of transmitting a status and use of the product or machinery.

In some embodiments, selective releasing data from the one or more smart device systems further comprises releasing a first data packet of information about a smart device system from the control device through a portal to a first third party system and releasing a different second data packet of information about the smart device system from the control device through a portal to a second third party system, wherein the data packets are generated based on the type of entity associated with the third party system, wherein the portal is associated with the control device and provides the ability to communicate outside a network established between the control device and the one or more smart device systems.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
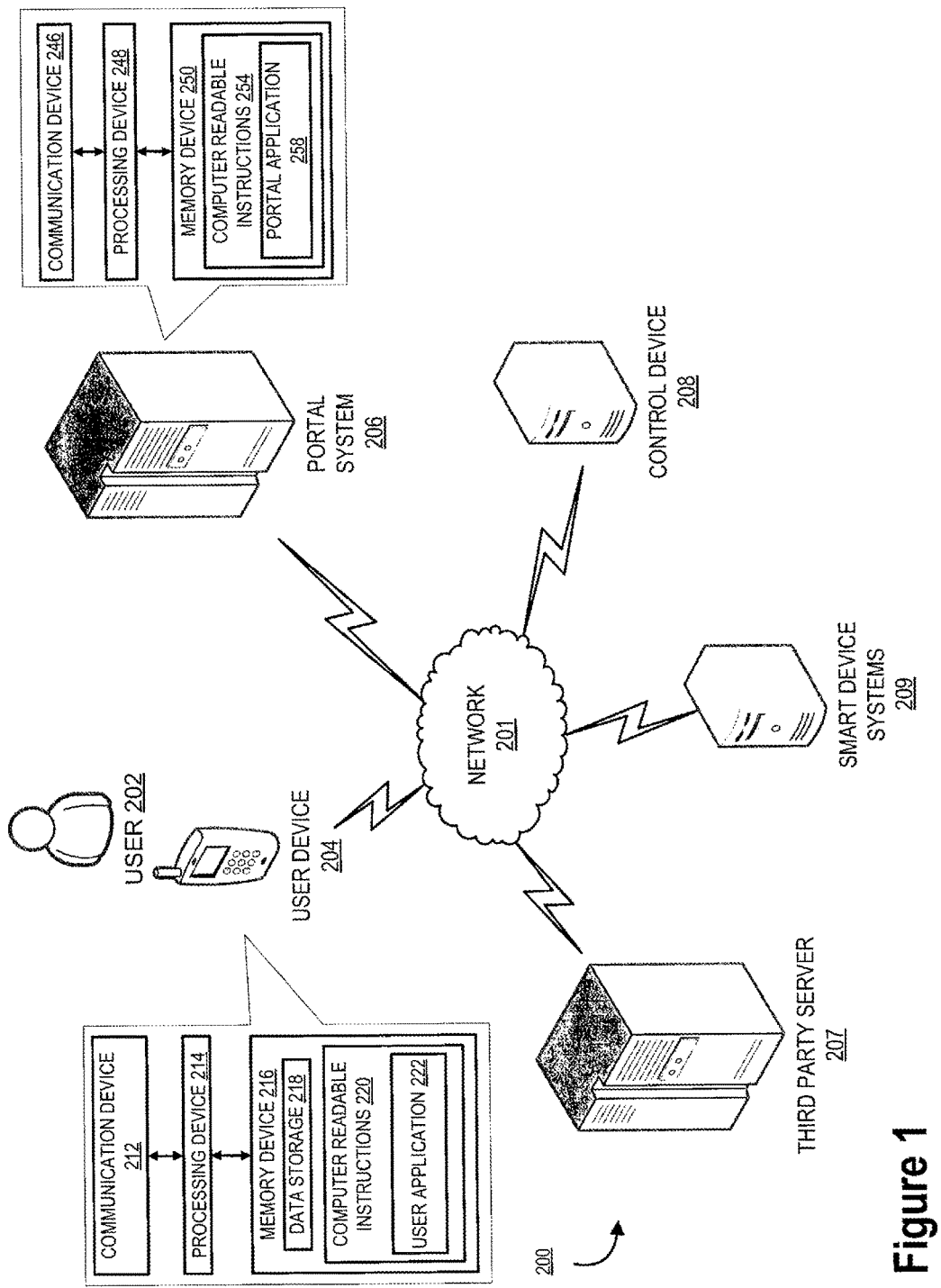
Figure 2:
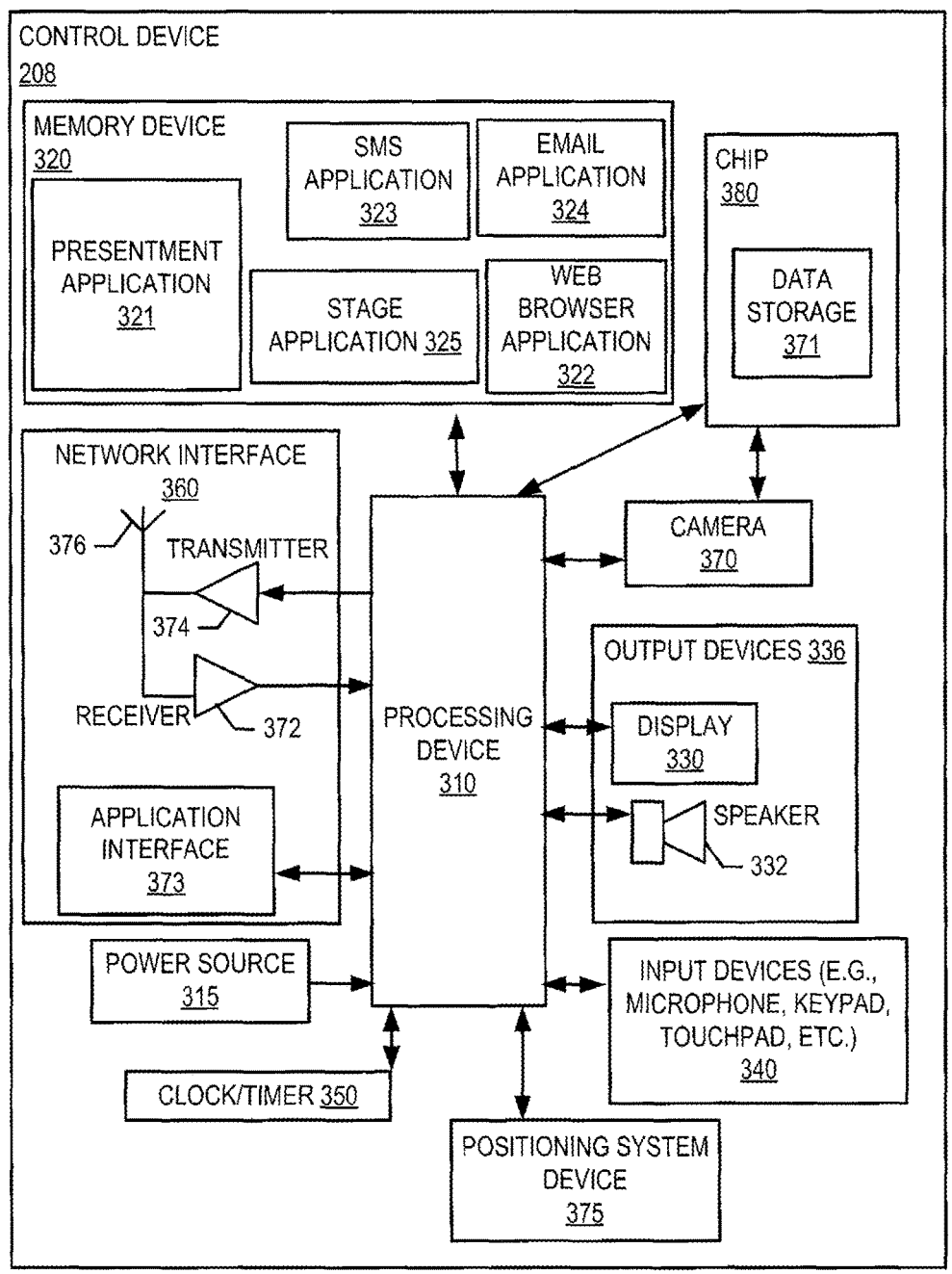
Figure 3:
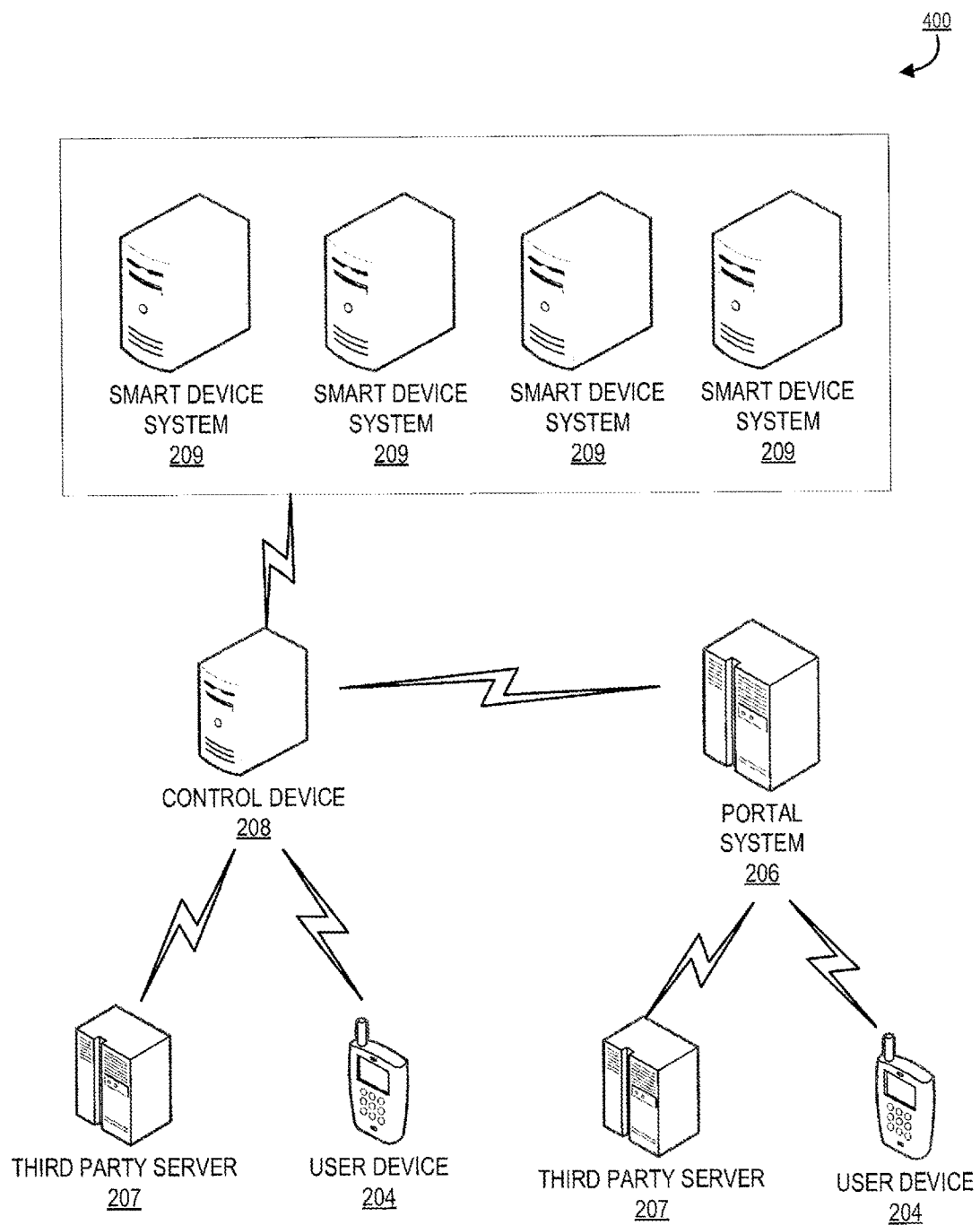
Figure 4:
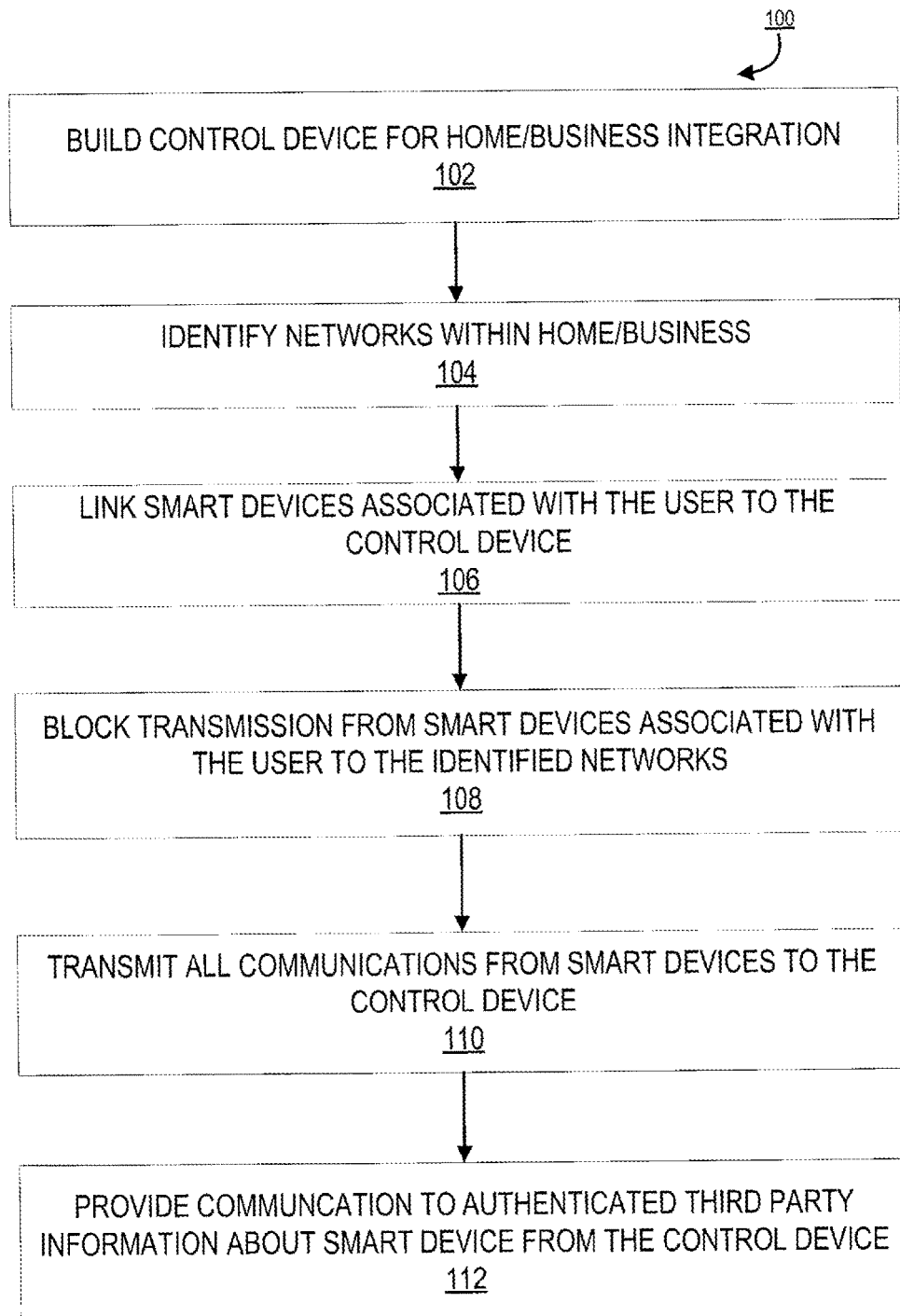
Figure 5:
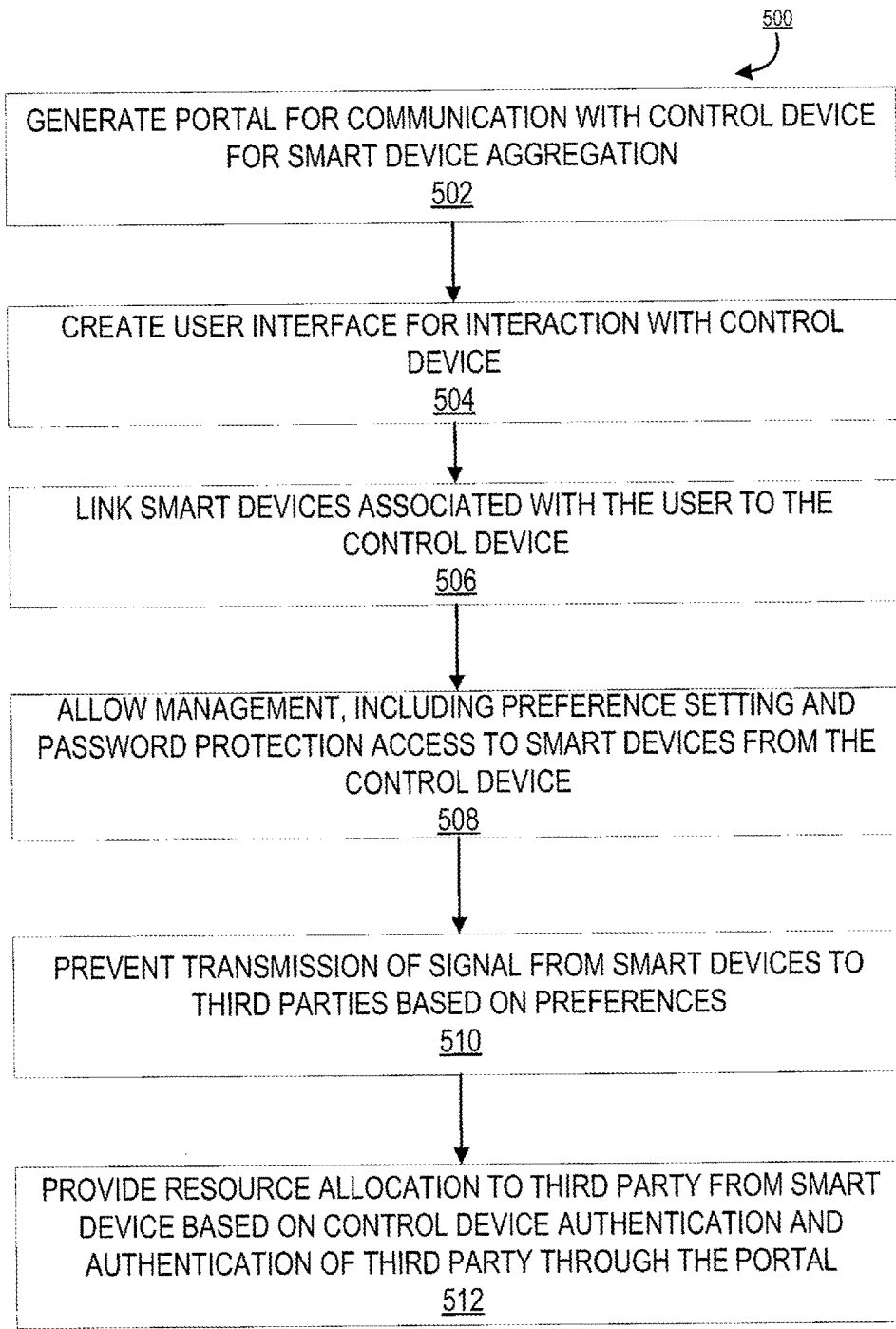
Figure 6:
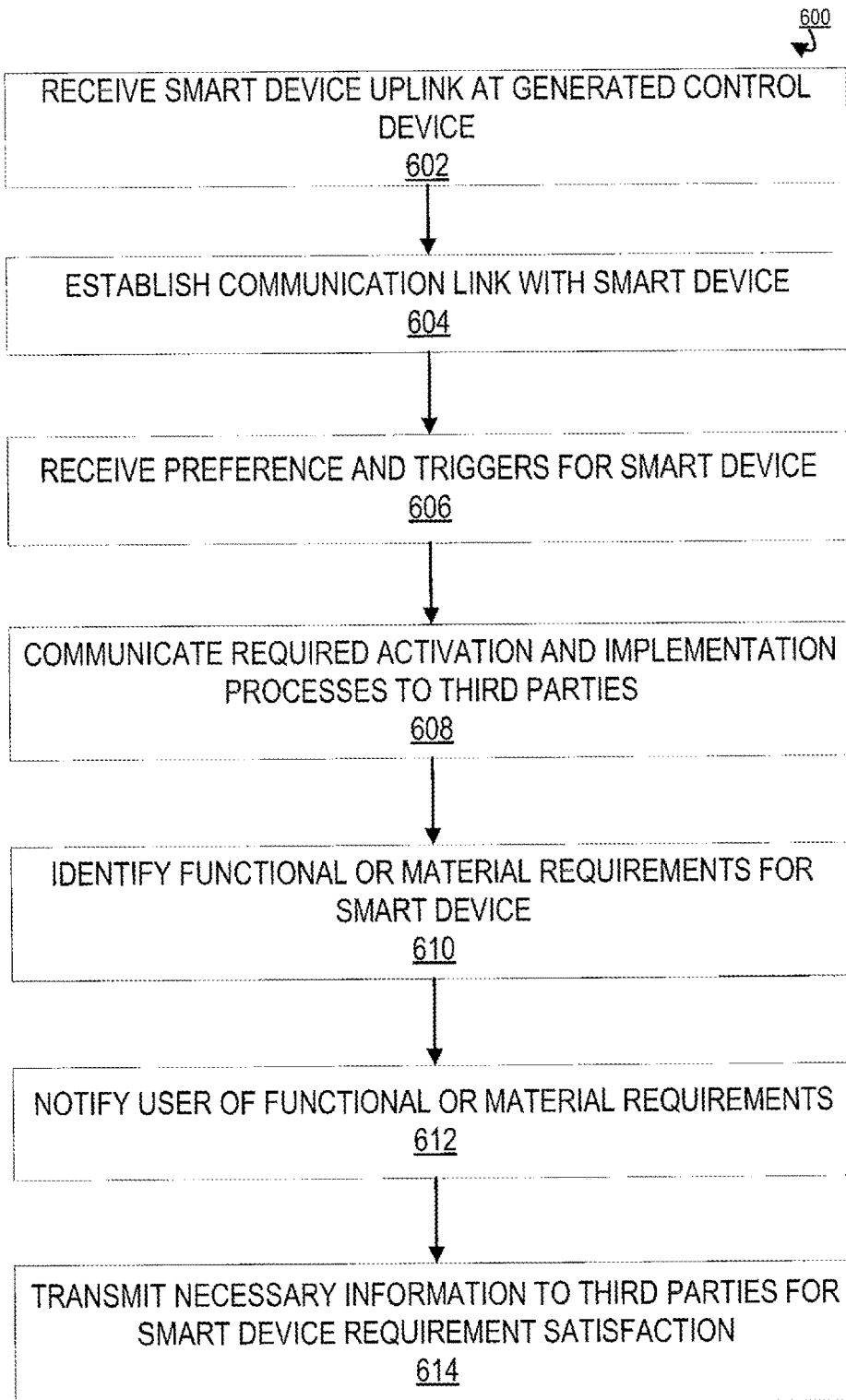
Figure 7:
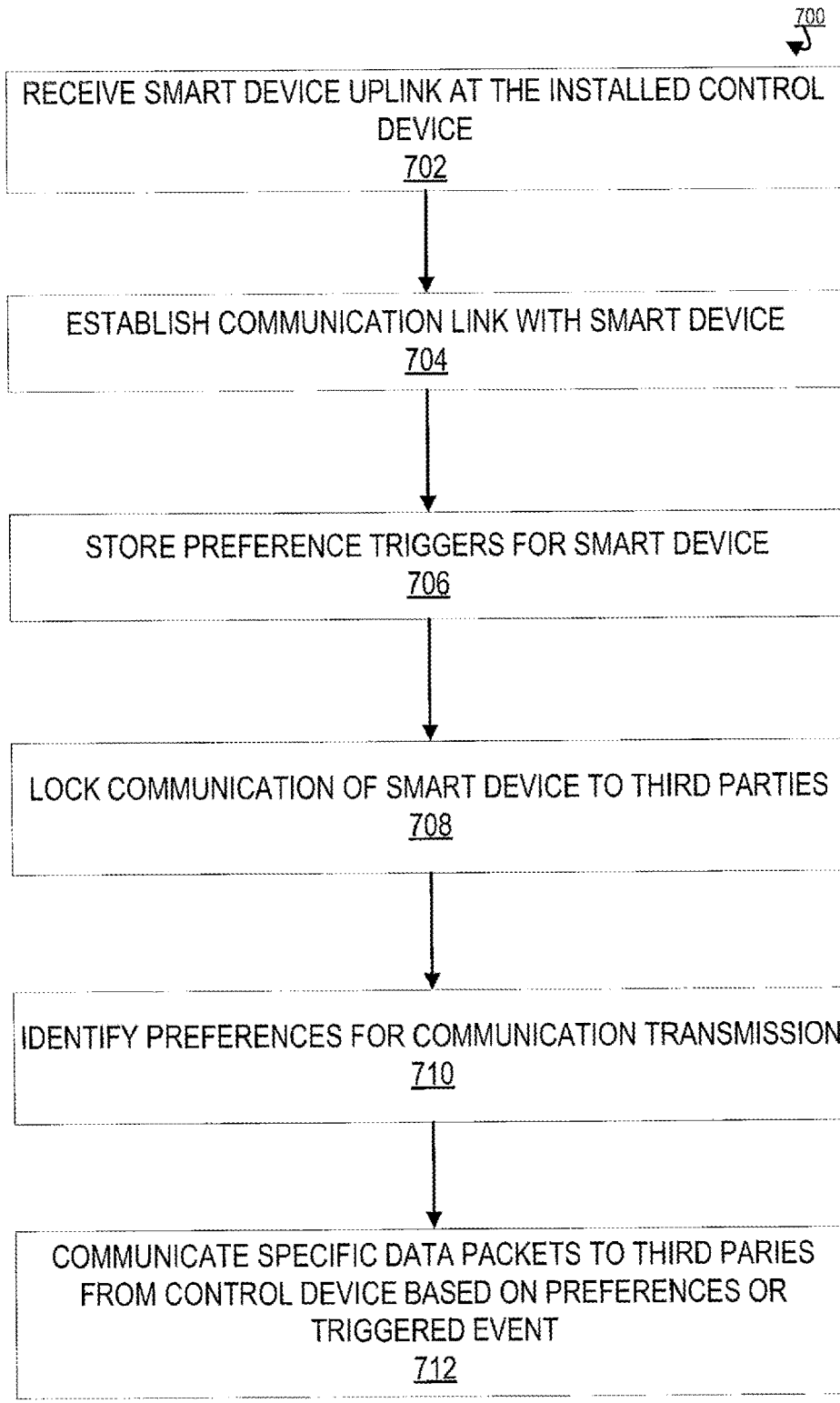

Having thus described embodiments of the invention in general terms, reference will now be made to the accompanying drawings, wherein:

FIG. 1 provides an aggregated machine-initiated resource distribution system environment, in accordance with one embodiment of the present invention;

FIG. 2 provides a control device system environment, in accordance with one embodiment of the present invention;

FIG. 3 provides a resource distribution system architecture environment, in accordance with one embodiment of the present invention;

FIG. 4 provides a high level process flow illustrating control device aggregated machine-initiated resource distribution, in accordance with one embodiment of the present invention;

FIG. 5 provides a process map illustrating resource distribution via a portal for smart device implementation through the control device, in accordance with one embodiment of the present invention;

FIG. 6 provides a process map illustrating resource distribution for smart device implementation through the control device, in accordance with one embodiment of the present invention; and FIG. 7 provides a process map illustrating resource distribution to third parties through control device for smart device implementation, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user" as used herein may refer to any entity or individual associated with a smart system at a home or business. In some embodiments, identities of an individual may include online handles, usernames, aliases, family names, maiden names, nicknames, or the like. For purposes of this invention, the term "user" and "user" may be used interchangeably. Furthermore, as used herein the term "user device" or "mobile device" may refer to mobile phones, personal computing devices, tablet computers, wearable devices, and/or any portable electronic device capable of receiving and/or storing data therein.

As used herein, a "user interface" generally includes a plurality of interface devices and/or software that allow a customer to input commands and data to direct the processing device to execute instructions. For example, the user interface may include a graphical user interface (GUI) or an interface to input computer-executable instructions that direct the processing device to carry out specific functions. Input and output devices may include a display, mouse, keyboard, button, touchpad, touch screen, microphone, speaker, LED, light, joystick, switch, buzzer, bell, and/or other user input/output device for communicating with one or more users.

A "transaction" or "resource distribution" refers to any communication between a user and the financial institution or other entity monitoring the user's activities to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

Embodiments of the present invention address these and/or other needs by providing an intermediary control device for aggregation of machine-initiated resource distribution. Thus fixing the technical challenges within the current network including the need to consolidate and aggregate data across devices associated with the user, the need to control and manage the flow of information from devices to third parties (privacy, filtering, protection), and the need to easily track and refresh a user's inventory of smart devices in a manner that allows key data to remain associated with the user while the user's inventory, device associations, and personal/business associations change over time.

The intermediary control device receives or picks-up all data transmitted from smart devices within a home or business and distributes the data transmitted to a portal for controlling and managing the flow of information from the smart devices to third parties. The intermediary can receive all data being transmitted from the smart devices within the home. Thus, even if a Wi-Fi or mobile device authenticated for that smart device is not active, the intermediary control device will be able to receive the data transmitted. The intermediary control device is configured as a disruptor of data, thus preventing data from being transmitted to third parties from the smart device. The intermediary control device may generate a private network for the data transmission from the smart devices, while still allowing a user to control and manage the data that does get pushed to a third party, via a mobile device.

FIG. 1 illustrates an aggregated machine-initiated resource distribution system environment 200, in accordance with one embodiment of the present invention. FIG. 1 provides the system environment 200 for which the distributive network system with specialized data feeds associated with resource distribution. FIG. 1 provides a unique system that includes specialized servers and system communicably linked across a distributive network of nodes required to perform the functions of resource allocation based on smart device data compilation.

As illustrated in FIG. 1, the smart device system 209 is operatively coupled, via a network 201 to the user device 204, third party servers 207, control device 208, and to the portal system 206. In some embodiments the smart device systems 209 can send information to the control device 208. In other embodiments, the smart device system 209 can send and receive information from the user device 204 and the portal system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual or entity that has one or more smart device systems 209 associated with the user 202, user's home, or user's business. In some embodiments, the user 202 has a user device, such as a mobile phone, tablet, computer, or the like. FIG. 1 also illustrates a user device 204. The user device 204 may be, for example, a desktop personal computer, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the portal system 206, the smart device systems 209, and the third party sever 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to send and receive communications with the portal system 206.

As further illustrated in FIG. 1, the portal system 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the smart device systems 209, the third party server 207, and the user device 204. As such, the communication device 246 generally comprises a modem, server, or other device for communicating with other devices on the network 201.

As further illustrated in FIG. 1, the portal system 206 comprises computer-readable instructions 254 stored in the memory device 250, which in one embodiment includes the computer-readable instructions 254 of a portal application 258. In some embodiments, the memory device 250 includes data storage 252 for storing data related to the system environment 200, but not limited to data created and/or used by the portal application 258.

In one embodiment of the portal system 206 the memory device 250 stores a portal application 258. In one embodiment of the invention, the portal application 258 may associate with applications having computer-executable program code that generate and code a tag for implementation onto a product. Furthermore, the portal system 206, using the processing device 248 codes certain communication functions described herein. In one embodiment, the computer-executable program code of an application associated with the portal application 258 may also instruct the processing device 248 to perform certain logic, data processing, and data storing functions of the application.

The processing device 248 is configured to use the communication device 246 to communicate with and ascertain data from control device 208 associated with the one or more smart device systems 209.

In the embodiment illustrated in FIG. 1 and described throughout much of this specification, the portal application 258 may be coded for the generation of a portal, communication with the control device 208 associated with the smart device systems 209, integration of security into the control device 208 associated with the smart device systems 209, control and/or blockage of smart device systems 209 communications to third party servers 207 through the control device 208, and triggering of specific data communications to third party servers 207 from the control device 208 based on smart device system 209 requirements.

As illustrated in FIG. 1, the third party server 207 is connected to the user device 204, control device 208 and portal system 206. The third party server 207 has the same or similar components as described above with respect to the user device 204 and the portal system 206. While only one third party server 207 is illustrated in FIG. 1, it is understood that multiple third party servers 207 may make up the system environment 200. The third party server 207 may be associated with one or more financial institutions, insurance corporations, warranty departments, inspection providers, permit providers, material providers, resource allocators, and the like. As such, the portal system 206 may communicate with the third party to notify the third party of a real-time update of the project for resource release.

As illustrated in FIG. 1, the smart device systems 209 is connected to the third party server 207, user device 204, and portal system 206. The smart device system 209 has the same or similar components as described above with respect to the user device 204 and the portal system 206. While only one smart device system 209 is illustrated in FIG. 1, it is understood that multiple smart device systems 209 may make up the system environment 200. It is understood that the servers, systems, and devices described herein illustrate one embodiment of the invention. It is further understood that one or more of the servers, systems, and devices can be combined in other embodiments and still function in the same or similar way as the embodiments described herein.

A "smart device" or "smart device system" as used herein means a device, apparatus and/or system that is capable of communicating with and transmitting information or data to and/or receiving information or data from other devices, systems or apparatuses including over network 201. The smart device system 209 may be for example, but not limited to, a machine such as an automobile, tractor trailer, airplane, manufacturing device, warehouse devices, material handling system, conveyor system, robotics or the like; appliances such as refrigerators, washer/dryers, dish washers, or the like; home entertainment devices or systems such as set top boxes, gaming systems, internet televisions, or the like; home or building systems such as home security systems, utility systems such as electrical, water, plumbing systems and apparatuses such as electric meters, water meters, hot water heaters, gas meters or the like; and personal devices such as wearable devices such as internet capable fitness devices, watches, glasses or the like. The list of smart devices provided herein is not exhaustive such that the smart device system 209 may be any device that includes a communication interface or module, software and/or hardware that allow the device to communicate data and/or information related to the device with other devices and/or systems over network 201.

FIG. 2 illustrates a control device system environment. The control device 208 is an intermediary control device that receives or picks-up all data transmitted from smart devices within a home or business and distributes the data transmitted to a portal for controlling and managing the flow of information from the smart devices to third parties. The control device 208 may receive all data being transmitted from the smart devices within the home. Thus, even if a Wi-Fi or mobile device authenticated for that smart device is not active, the control device 208 will be able to receive the data transmitted. In this way, the control device 208 may generate a private communication channel for transmitting communications between the smart devices within the home or business and the control device 208. As such, when the smart devices are not linked to their mobile device network or home network, the control device 208 may still receive communications from the smart devices through the private communication channel. The control device 208 is further configured as a disruptor of data, thus preventing data from being transmitted to third parties from the smart devices. The control device 208 may generate a private network for the data transmission from the smart devices, while still allowing a user to control and manage the data that does get pushed to a third party, via a mobile device.

The control device 208 may generally include a processing device 310 communicably coupled to devices as a memory device 320, output devices 336, input devices 340, a network interface 360, a power source 315, a clock or other timer 350, a camera 370, a positioning system device 375, one or more chips 380, and the like.

The processing device 310 is operatively coupled to the network communication interface 360 and the memory device 320. The control device 208 may also have a control system for controlling the physical operation of the device. The control system may comprise one or more sensors for detecting operating conditions of the various mechanical and electrical systems that comprise the control device 208 or of the environment in which the control device 208 is used. The sensors may communicate with the processing device 310 to provide feedback to the operating systems of the device. The control system may also comprise metering devices for measuring performance characteristics of the control device 208. The control system may also comprise controllers such as programmable logic controllers (PLC), proportional integral derivative controllers (PID) or other machine controllers. The control device 208 may also comprise various electrical, mechanical, hydraulic or other systems that perform various functions of the control device 208. These systems may comprise, for example, electrical circuits, motors, compressors, or any system that enables functioning of the smart device The processing device 310 may include functionality to operate one or more software programs or applications, which may be stored in the memory device 320. For example, the processing device 310 may be capable of operating a connectivity program, such as a web browser application 322. The web browser application 322 may allow for communication with the portal system 206 for providing data about the product for identification of the stage of a project. In this way, the control device 208 may transmit and receive web content, such as, for example, product valuation, location-based content, and/or other web page content, according to a Wireless Application Protocol (WAP), Hypertext Transfer Protocol (HTTP), and/or the like.

The processing device 310 may also be capable of operating applications, such as a stage application 325 and/or a presentment application 321. The stage application 325 and/or presentment application 321 may be downloaded from a server and stored in the memory device 320 of the control device 208. Alternatively, the stage application 325 and/or presentment application 321 may be pre-installed and stored in a memory in the chip 380.

In such an embodiment, the control device 208 may previously store the stage application 325 and/or presentment application 321 prior to affixing the smart device systems 209 to the product. In this way the stage application 325 and/or presentment application 321 may remain and be stored on the control device 208.

The stage application 325 provides the control device 208 with a determination module for the data that the control device 208 should communicate to the portal system 206.

The presentment application 321 provides the control device 208 with communication abilities to present the data to the portal system 206. The presentment application 321 may communicate with the other devices on the network 201 to provide real-time status of the control device 208 as permitted by the portal system 206 based on triggers and user 202 preferences.

In some embodiments, the control device 208 access one or more databases or datastores (not shown) to search for and/or retrieve information related to the smart devices. In some embodiments, the control device 208 access both a memory and/or datastore local to the smart devices within a home as well as a datastore remote from the smart device systems.

The chip 380 may include the necessary circuitry to provide data gathering and presentation functionality to the control device 208. Generally, the chip 380 will include data storage 371 which may include data associated with the products that the control device 208. The tag chip 380 and/or data storage 371 may be an integrated circuit, a microprocessor, a system-on-a-chip, a microcontroller, or the like. In this way, the chip 308 will included data storage 371 which may include data associated with the presentment application 321.

Of note, while FIG. 2 illustrates the chip 380 as a separate and distinct element within the control device 208, it will be apparent to those skilled in the art that the chip 380 functionality may be incorporated within other elements in the control device 208. For instance, the functionality of the chip 380 may be incorporated within the memory device 320 and/or the processing device 310. In a particular embodiment, the functionality of the chip 380 is incorporated in an element within the control device 208 that provide use information, product activity, product depletion, and the like to the control device 208. Still further, the chip 380 functionality may be included in a removable storage device such as an SD card or the like.

The processing device 310 may be configured to use the network interface 360 to communicate with one or more other devices on a network 201. In this regard, the network interface 360 may include an antenna 376 operatively coupled to a transmitter 374 and a receiver 372 (together a "transceiver"). The processing device 310 may be configured to provide signals to and receive signals from the transmitter 374 and receiver 372, respectively. The signals may include signaling information in accordance with the air interface standard of the applicable cellular system of the wireless telephone network that may be part of the network 201. In this regard, the smart device systems 209 may be configured to operate with one or more air interface standards, communication protocols, modulation types, and access types. By way of illustration, the control device 208 may be configured to operate in accordance with any of a number of first, second, third, and/or fourth-generation communication protocols and/or the like. For example, the control device 208 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The control device 208 may also be configured to operate in accordance with non-cellular communication mechanisms, such as via a wireless local area network (WLAN) or other communication/data networks.

The network interface 360 may also include an application interface 373 in order to allow a user 202 to execute some or all of the above-described processes with respect to the presentment application 321 and/or the chip 380. The application interface 373 may have access to the hardware, e.g., the transceiver, and software previously described with respect to the network interface 360. Furthermore, the application interface 373 may have the ability to connect to and communicate with an external data storage on a separate system within the network 201.

The control device 208 may have an interface that includes user output devices 336 and/or input devices 340. The output devices 336 may include a display 330 (e.g., a liquid crystal display (LCD) or the like) and a speaker 332 or other audio device, which are operatively coupled to the processing device 310. The input devices 340, which may allow the control device 208 to receive data from a user 202, may include any of a number of devices allowing the control device 208 to receive data from a smart device, third party, or user 202, such as a keypad, keyboard, touch-screen, touchpad, microphone, mouse, joystick, other pointer device, button, soft key, and/or other input device(s).

The control device 208 may further include a power source 315. Generally, the power source 315 is a device that supplies electrical energy to an electrical load. In some embodiment, power source 315 may convert a form of energy such as solar energy, chemical energy, mechanical energy, or the like to electrical energy. Generally, the power source 315 in a control device 208 may be a battery, such as a lithium battery, a nickel-metal hydride battery, or the like, that is used for powering various circuits, e.g., the transceiver circuit, and other devices that are used to operate the control device 208. Alternatively, the power source 315 may be a power adapter that can connect a power supply from a power outlet to the control device 208. In such embodiments, a power adapter may be classified as a power source "in" the control device 208.

The control device 208 may also include a memory device 320 operatively coupled to the processing device 310. As used herein, memory may include any computer readable medium configured to store data, code, or other information. The memory device 320 may include volatile memory, such as volatile Random Access Memory (RAM) including a cache area for the temporary storage of data. The memory device 320 may also include non-volatile memory, which can be embedded and/or may be removable. The non-volatile memory may additionally or alternatively include an electrically erasable programmable read-only memory (EEPROM), flash memory or the like.

The memory device 320 may store any of a number of applications or programs which comprise computer-executable instructions/code executed by the processing device 310 to implement the functions of the control device 208 described herein. For example, the memory device 320 may include such applications as a presentment application 321, stage application 325, a web browser application 322, an SMS application 323, an email application 324, or the like.

In some embodiments, the control device 208 may identify the activity or use of the product associated with the smart device systems within a home. The control device 208 may do this via a closed network linkage that is available upon use of an internet signal within the home, a mobile phone internet connection, or generated independently of the same. In some embodiments, the control device 208 may do this via a positioning system device 375, camera 370, and the like. As such, the control device 208 may identify when the product is being used, how often it is being used, and the like based on the smart device communication. Furthermore, the control device 208 may identify when maintenance may be required based on an identification of the product and regular maintenance required for that product to be maintained based on the communication with the smart device.

FIG. 3 illustrates a resource distribution system architecture environment 400, in accordance with one embodiment of the present invention. As illustrated, one or more smart device systems 209 may be at or around a user's home or other entity. This may include equipment, machinery, electronic devices, tools, furniture, buildings, clothing, materials, or the like equipped with technology capably of communicating across one or more devices via an interconnection. The smart devices 209 may be identified as being in proximity, within 100 feet, 500 feet, or the like to the user's home or entity associated with the user. The system may identify these smart devices 209 based on global positioning, signal recognition, code identification, or the like.

The smart devices 209 may be communicably linked to the control device 208. The smart devices 209 may be linked via Wi-Fi or mobile communication channels programmed for communication by the smart devices 209. In other embodiments, the smart devices 209 may communicate with the control device 208 via a private secure communication channel generated by the control device 208. As such, even when no communication network is available, upon assessing a communication network, the smart devices 209 may communicate all data to the control device 208.

In some embodiments, the control device 208 acts as a disruptor such that the smart devices 209 cannot communicate to or receive data from any device or system other than the control device 208.

As discussed in further detail above with respect to FIG. 2, a control device 208 generally includes, but is not limited to, a network communication interface, a processing device, and a memory device such as described herein. The processing device is operatively coupled to the network communication interface and the memory device. The control device 208 may also have a control system for controlling the physical operation of the device and controlling the smart devices associated with the control device 208. The control system of the control device 208 may comprise one or more sensors for detecting operating conditions of the various mechanical and electrical systems that comprise the control device 208 or of the environment in which smart devices are used. The sensors may communicate with the processing device to provide feedback to the operating systems of the smart device. The control system may also comprise metering devices for measuring performance characteristics of the smart devices. The control system may also comprise controllers such as programmable logic controllers (PLC), proportional integral derivative controllers (PID) or other machine controllers. The control device 208 may also comprise various electrical, mechanical, hydraulic or other systems that perform various functions of the control device 208. These systems may comprise, for example, electrical circuits, motors, compressors, or any system that enables functioning of the smart device. The control device 208 may also include a resource distribution communication interface device that allows the control device 208 to be connected to and to communicate with devices on the network and including the portal system 206, third party server 207, and/or the user device 204. The communication interface device may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface the control device 208 may also include a communication interface device that may be connected by a hardwire connection to the resource distribution device. The interface device may comprise a connector such as a USB, SATA, PATA, SAS or other data connector for transmitting data to and from the smart device 208 to the portal system 206. In some embodiments the control device 208 may comprise a port or plug that is compatible with a mating port or plug on portal system 206.

As such, the control device 208 may communicate information about the status of the smart devices which may aid in determining the stage of the product lifecycle or the like for resource distribution management. This information communicated may include use of products, machine run time, materials available, communication requirements, maintenance status, resource requirements, third party access, and/or the like.

The control device 208 may gather the information and data from the various one or more smart device systems 209 in order to trigger identification of any predetermined preferences or triggering events that lead to communication allocation to third parties or purchasing of materials for the product associated with the one or more smart device systems 209.

The control device 208, once the step completion is identified, may communicate the necessary information to third parties and the user based on need, preferences, or triggering points. In some embodiments, the control device 208 may communicate to third party servers 207, such as material providers, resource managers for release of resources for continued project development, insurance companies for added or additional insurance requirements based on the completion of the step or the like. Furthermore, the portal system 206 may communicate the step completion to the user device 204 for the user to identify and recognize in real-time the status of the smart device systems 209.

In some embodiments, the control device 208 may communicate the information received from the smart device systems 209 directly to a third party server 207 and/or a user device 204. In this way, the control device 208 may communicate, with authority from the user to one or more third parties in order to provide updates, maintenance, data, or the like to the third party about the smart devices.

In some embodiments, as illustrated, the control device 208 may communicate the information received from the smart device systems 209 to the portal system 206. The portal system 206 may generate a portal for communication with the third party server 207 and the user device 204.

FIG. 4 illustrates a high level process flow illustrating control device aggregated machine-initiated resource distribution 100, in accordance with one embodiment of the present invention. As illustrated in block 102, the process 100 is initiated by the building of a control device for the user home or business and integration of the control device into the home or business. In this way, the control device is capable of identifying signals from one or more smart devices and is capable of communicating with the devices. The control device may comprise storage space for storing one or more smart device recognition codes, the preferences for those smart devices, and the triggering events for those smart devices, while also associating the smart devices with the user.

Once the control device has been integrated, the process 100 continues by identifying the networks within the home or business, as illustrated in block 104. In this way, the control device may identify the mobile networks, wireless networks, hardwire networks, or the like that are programmed for each smart device associated with the user. As such, some smart devices may be associated with a user mobile device network, while other smart devices may be associated with a wireless home network. The control device may identify each of the networks and the smart devices that are associated with each network.

As illustrated in block 106, the process 100 continues by linking the smart devices associated with the user to the control device. In this way, the control device may link the smart devices associated with the user. As such, the control device may correlate and aggregate the data from the smart devices associated with the user. The control may aggregate the data, passwords, authentications, and the like required for each smart device operation. Furthermore, the control device may, once the smart devices are associated, prevent the smart devices from external communication with outside parties. In this way, the smart devices may not be breached by or be able to transmit data to or from a third party device not authorized, thus providing security for the smart devices and the user.

In some embodiments, the control device may identify the proprietary protocols for each brand of smart device and create a standard for the communication with the smart devices. In this way, the control device may be a proxy layer between the different smart device application program interfaces.

In this way, as illustrated in block 108, the control device may block the transmission from the smart devices associated with the user to the identified networks, such that the smart devices may not transmit signals to third party devices. As illustrated in block 110, all of the transmissions that would go to those networks to third parties or other sources may be transmitted from the smart devices to the control device. In some embodiments, the transmission may be from the identified networks, such as a mobile network, Wi-Fi network, wired network, or the like. In other embodiments, the transmission may be via a secure network generated by the control device.

As illustrated in block 112, the process 100 is completed by providing communication to third parties from the control device with information about the smart devices, wherein the third parties that are communicated with are authenticated third parties. In some embodiments, the control device allows for user management of all smart devices via the control device, including allowing preference setting and password protected access to the group of user associated smart devices. In this way, the user may set smart device preferences, the user may set one password for accessing all smart devices, manage the external communication parameters for the smart devices, prevent external communication into the smart devices for data extraction, a single review location for reviewing the status of all smart devices at the portal location, and manage material requirements desired by the smart devices. In this way, the portal provides a single access point for management, maintenance, and signal controlling of all smart devices associated with a user.

In some embodiments, preventing transmission of signals from the smart devices to third parties is based on user or control device preferences. In some embodiments, the preferences may be provided by the control device. In other embodiments, the user may input the preferences via an interface associated with the control device. The preferences may include trigger events that may trigger the communication from the smart device to the user and/or a third party. This may include a requirement from the smart device for material, maintenance, or the like. The preferences may also include when the smart device may be allowed to transmit or receive signals from a third party and the specific third parties the smart device may communicate with. In some embodiments, the portal may prevent the smart device from receiving any communications from a third party system. In some embodiments, the control device may prevent the smart device from transmitting communications to a third party system. In some embodiments, the control device may limit the smart device from receiving communications from a third party system depending on the type of third party, such as a manufacture of the smart device, material provider for the smart device, maintenance provider for the smart device, asset allocator for the smart device, or the like. In some embodiments, the control device may limit the smart device communication to third party systems depending on the type of third party, such as a manufacture of the smart device, material provider for the smart device, maintenance provider for the smart device, asset allocator for the smart device, or the like.

In some embodiments, resources may be allocated to a third party from the smart devices based on control device recognition and authentication of the third party. In this way, the control device may comprise one or more resource accounts holding resources for purchasing maintenance, materials, or the like for the products associated with the smart devices. As such, the control device may control the distribution of the resources to one or more third parties. The control device may be associated with a financial institution and as such may recognize approved third parties for resource distribution based on an identification of the third parties that do not or have not misappropriate funds in the past for other financial institution resources. Upon control device recognition of an approved third party and user authentication for resource distribution, the control device may transmit the resource to the third party system.

FIG. 5 illustrates a process map illustrating resource distribution via a portal for smart device implementation through the control device 500, in accordance with one embodiment of the present invention. As illustrated in block 502, the process 500 is initiated by generating a portal for communication with the control device that aggregated the smart devices within a home or business. The portal may be used by the control device to transmit a unified signal from the home or business to a third party for smart device maintenance, updates, data presentation, or the like.

As illustrated in block 504, the process continues by creating a user interface for interaction with the control device. In this way, the user interface may be a user facing interface that may be configured to be readable and presentable onto a user device, such as a mobile phone, tablet, or the like. Furthermore, the control device may receive and translate the format of any preferences the user may implement for his/her associated smart devices via the interface into the control device processing protocol.

Next, as illustrated in block 506, the process continues by linking all of the smart devices that are associated with the user to the control device. In this way, the control device may correlate and aggregate the data from the smart devices associated with the user. The control device may aggregate the data, passwords, authentications, and the like required for each smart device operation. Furthermore, the control device may, once the smart devices are associated with the control device, prevent the smart devices from external communication without first communicating a request to the control device for the external communication. In this way, the smart devices may not be breached by or be able to transmit data to or from a third party devices not authorized, thus providing security for the smart devices and the user.

As illustrated in block 508, the process 500 continues by allowing management, including preference setting and password protected access of the smart devices from the control device. As such, the control device may be a centralized processing device controlling the functionality and communication ability of the smart devices associated with the user. Furthermore, the user may set smart device preferences using the control device. The user may set one password for accessing all smart devices, manage the external communication parameters for the smart devices, prevent external communication into the smart devices for data extraction, a single review location for reviewing the status of all smart devices at the control device, and manage material requirements desired by the smart devices. In this way, the control device provides a single access point for management, maintenance, and signal controlling of all smart devices associated with a user.

Next, as illustrated in block 510, the process 500 continues by preventing transmission of signals from the smart devices to third parties based on preferences. In some embodiments, the preferences may be provided by the control device. In other embodiments, the user may input the preferences via an interface associated with the control device. The preferences may include trigger events that may trigger the communication from the smart device to the user and/or a third party. This may include a requirement from the smart device for material, maintenance, or the like. The preferences may also include when the smart device may be allowed to transmit or receive signals from a third party and the specific third parties the smart device may communicate with. In some embodiments, the portal may prevent the smart device from receiving any communications from a third party system. In some embodiments, the portal may prevent the smart device from transmitting communications to a third party system. In some embodiments, the portal may limit the smart device from receiving communications from a third party system depending on the type of third party, such as a manufacture of the smart device, material provider for the smart device, maintenance provider for the smart device, asset allocator for the smart device, or the like. In some embodiments, the control device may limit the smart device communication to third party systems depending on the type of third party, such as a manufacture of the smart device, material provider for the smart device, maintenance provider for the smart device, asset allocator for the smart device, or the like.

As illustrated in block 512, the process 500 is completed by providing a resource allocation to a third party from the smart devices based on control device recognition and authentication of the third party. In this way, the control device may comprise one or more resource accounts holding resources for purchasing maintenance, materials, or the like for the products associated with the smart devices. As such, the control device may control the distribution of the resources to one or more third parties. The control device may be associated with a financial institution, and as such may recognize approved third parties for resource distribution based on an identification of the third parties that do not or have not misappropriate funds in the past for other financial institution resources. Upon control device recognition of an approved third party and user authentication for resource distribution, the control device may transmit the resource to the third party system.

FIG. 6 provides a process map illustrating resource distribution for smart device implementation through the control device 600, in accordance with one embodiment of the present invention. As illustrated in block 602, the process 600 is initiated by receiving a smart device uplink at the control device installed at the user home or business. In this way, the control device may identify all smart devices associated with the user and uplink those devices to the control device for integration. Once an uplink is generated, the control device may establish a communication link with the smart devices, as illustrated in block 604. The communication linkage may be established and prevent the smart devices from making communicable linkages with any other device or third party, as such, the control device may be the only means of smart device communication, effectively blocking and translating the form of the smart device such that it is unable to perform communications with other devices. In this way, the control device may eliminate any transmitting signal the smart device may have, such as to not be recognized by third party devices.

Next, as illustrated in block 606, the process 600 continues by receiving preferences and triggers for each smart device. The control device may store the preferences and triggers for the smart device. The preferences may be user or control device directed. The preferences may include which, if any, third parties the smart device may communicate with through the control device. The preferences may include resource allocation preferences, such as when and to which third party the control device may provide resources to for the smart device. Preferences may also include the purchasing of maintenance, materials, or the like required by the product associated with the smart device. In some embodiments, triggers may be user, control device, or smart device selected. The triggers may be times, uses, amounts of material remaining, or the like that may trigger a maintenance request, material purchase request, sale, or the like of a product associated with the smart device. The control device may store these preferences and triggers for each smart device. In some embodiments, the smart devices may communicate the triggering of a trigger event or preference to the control device. In other embodiments, the control device may recognize the preference or triggering event.

As illustrated in block 608, the process 600 continues by communicating the required activation and implementation processes to third parties. In this way, the control device may communicate the requirements and triggers to third parties. In this way, the control device may communicate the activations and implementation processes to the third party systems for the smart devices. As such, the smart devices may not communicate directly with the third party systems, preventing misappropriation by communication of resources, data, or statistics to unauthorized third parties and prevention of third party unauthorized access of the data on the smart device.

As illustrated in block 610, the process 600 continues by identifying functional or material requirements for the smart device. In this way, the control device may identity the needs of the product associated with the smart device, such as material needs, functional requirements, maintenance needs, or the like. Furthermore, the control device may identify the timing for the requirements and set calendaring for the purchase of the requirements for the products associated with the smart devices. As illustrated in block 612, the process 600 continues by notifying the user of the functional and/or material requirements. The control device may communicate to the user, via the user device, via text message, email, voice communication, or the like. The notification may require user input in order to process the functional or material requirements, such as purchasing the materials with one or more resources. In other embodiments, the control device may automatically purchase the materials with one or more user resources without authorization from the user. Finally, as illustrated in block 614, the process 600 is completed by transmitting the necessary information to a third party for smart device requirement satisfaction. In this way, the control device may provide the information, such as a product type, a material type, or the like to the third party for requirement satisfaction for the product associated with the smart device to be running. In some embodiments, the control device may communicate directly with the third party. In other embodiments, the control device may communicate through a portal to the third party.

In some embodiments, the control device may provide warranty registration and services. In other examples, the control device may transmit information necessary to register a warranty with the manufacturer of the product. The control device may transmit data associated with the product or failure of the product and notify the user. Furthermore, the control device may provide selective release of data to different third parties. For example, a mechanic may be automatically supplied with a set of pertinent data about the vehicle that is not otherwise public, while the insurance company may be provided with a completely different set of pertinent data. In this way, the control device may determine the pertinent data required by each of the different third parties and provide the pertinent data to the third party upon authorization and necessity.

In some embodiments, the smart device registered with the control device can be added to insurance company records, such that when a product is lost or stolen, the product with the smart device can be recovered and/or an insurance claim can be initiated and paid. The data compilation, aggregation, and correlation made possible by the control device also permits the financial institution to package and market packaged data to third parties, and to acquire data (such as power usage patterns or the like) that may not be available to or from public utilizes and other entities with informational needs. The control device may also allow a user to authenticate the control device to allow for payment rail usage and payment completion via resources.

FIG. 7 provides a process map illustrating resource distribution to third parties through control device for smart device implementation 700, in accordance with one embodiment of the present invention. The process 700 is initiated by receiving the smart device uplink at the installed control device, as illustrated in block 702. In this way, the control device may identify all smart devices associated with the user and uplink those devices to the control device for integration. Once an uplink is completed, the control device may establish a communication link with the smart devices, as illustrated in block 704. The communication linkage may be established and prevent the smart devices from making communicable linkages with any other device or third party, as such, the control device may be the only means of smart device communication, effectively blocking and translating the form of the smart device such that it is unable to perform communications with other devices. In this way, the control devices may eliminate any transmitting signal the smart device may have, such as to not be recognized by third party devices.

Next, as illustrated in block 706, the process 700 continues by storing preferences and triggers for the smart device. The preferences may be user or control device directed. The preferences may include which, if any, third parties the smart device may communicate with via the control device. The preferences may include resource allocation preferences, such as when and to which third party the control device may provide resources to for the smart device. Preferences may also include the purchasing of maintenance, materials, or the like required by the product associated with the smart device. In some embodiments, triggers may be user, control device, or smart device selected. The triggers may be times, uses, amounts of material remaining, or the like that may trigger a maintenance request, material purchase request, sale, or the like of a product associated with the smart device. The control device may store these preferences and triggers for each smart device. In some embodiments, the smart devices may communicate the triggering of a trigger event or preference to the control device. In other embodiments, the control device may recognize the preference or triggering event.

Next, as illustrated in block 708, the process 700 continues by locking communications of the smart devices with third parties or any outside system. As such, the control device generates code to transmit to the smart device to lock the communications of the smart device to third parties. In this way, the control device generates code that may be transmitted to and stored in the smart device that may limit the smart device from communicating with any external device other than the control device. As such, the control device may control the communication, both received and transmitted, from the smart devices. In this way, all smart device data and communications may be transmitted to the control device, which in turn may provide communications to any third parties if necessary based on preferences, triggers, or requirement satisfaction.

As illustrated in block 710, the process 700 continues by identifying the preferences and triggers for communication transmission. As such, the control device may reach out to the user, via an interface, to receive user preferences and triggers for resource distribution, material purchase, maintenance, or the like. In some embodiments, the control device may determine the preferences and triggers based on the type of product associated with the smart device.

Finally, as illustrated in block 712, the process 700 is completed by communicating the specific data packets to a third party from control device based on the preferences and/or triggering events. In some embodiments, the data packets may be provided directly from the control device to the third party. In other embodiments, the data packets may be provided to the third party from the control device via a portal.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for aggregation and distribution of machine-initiated resources, the system being a control device and comprising:
    a control device housing, wherein the control device housing is positioned within a home or business associated with a user and wherein the control device housing comprises the control device, wherein the control device further comprises:
        a memory device with computer-readable program code stored thereon;
        a communication device;
        a processing device operatively coupled to the memory device and the communication device, wherein the processing device is configured to execute the computer-readable program code to:
            identify one or more smart device systems associated with the user;
            generate, via the control device, a communicable linkage with the one or more smart device systems associated with the user;
            block, via the control device, external communication to or from the one or more smart device systems via networks other than the generated communicable linkage;
            uplink the one or more smart device systems to the control device and store the one or more smart device systems information;
            allow management of the one or more smart device systems from an interface associated with the control device;
            identify a triggering event occurring, wherein the triggering event is a predetermined event inputted at the interface by the user or control device identified; and
            selective release data from the control device regarding one or more smart device systems to one or more third party systems based on the triggering event occurrence.

2. The system of claim 1, wherein blocking, via the control device, external communication to or from the one or more smart device systems via networks other than the generated communicable linkage further comprises transmitting data packets to the one or more smart device systems and store the data packets on the one or more smart device systems, wherein the data packet includes code preventing communication transmissions from the one or more smart device systems to third party systems.

3. The system of claim 1, wherein allowing management of the one or more smart device systems from an interface associated with the control device further comprises the interface being associated with the housing of the control device or the interface being presented via a network to a user device.

4. The system of claim 1, wherein identifying one or more smart device systems associated with the user further comprises identifying one or more smart devices within a same building or room as the control device by identifying a geographic location of a project using GPS and identifying transmitting signals associated with smart device systems from within the geographic location.

5. The system of claim 1, wherein the triggering event is identified based on a communication from the one or more smart device systems to the control device identifying a maintenance or material requirement for a product associated with the one or more smart device systems.

6. The system of claim 1, wherein the third party is a materials provider, maintenance provider, insurance provider, or warrantee provider providing service to a product associated with the one or more smart device systems.

7. The system of claim 1, wherein the one or more smart device systems further comprise products or machinery with transmitting signals associated with the product or machinery capable of transmitting a status and use of the product or machinery.

8. The system of claim 1, wherein selective releasing data from the one or more smart device systems further comprises releasing a first data packet of information about a smart device system from the control device through a portal to a first third party system and releasing a different second data packet of information about the smart device system from the control device through a portal to a second third party system, wherein the data packets are generated based on the type of entity associated with the third party system.

9. A computer program product for aggregation and distribution of machine-initiated resources, the computer program product being within a control device and comprising at least one non-transitory computer-readable medium having computer-readable program code portions embodied therein, the computer-readable program code portions comprising:
    an executable portion configured for identifying one or more smart device systems associated with the user;
    an executable portion configured for generating, via the control device, a communicable linkage with the one or more smart device systems associated with the user;
    an executable portion configured for blocking, via the control device, external communication to or from the one or more smart device systems via networks other than the generated communicable linkage;
    an executable portion configured for uplinking the one or more smart device systems to the control device and store the one or more smart device systems information;
    an executable portion configured for allowing management of the one or more smart device systems from an interface associated with the control device;
    an executable portion configured for identifying a triggering event occurring, wherein the triggering event is a predetermined event inputted at the interface by the user or control device identified; and
    an executable portion configured for selective releasing data from the control device regarding one or more smart device systems to one or more third party systems based on the triggering event occurrence.

10. The computer program product of claim 9, wherein blocking, via the control device, external communication to or from the one or more smart device systems via networks other than the generated communicable linkage further comprises transmitting data packets to the one or more smart device systems and store the data packets on the one or more smart device systems, wherein the data packet includes code preventing communication transmissions from the one or more smart device systems to third party systems.

11. The computer program product of claim 9, wherein allowing management of the one or more smart device systems from an interface associated with the control device further comprises the interface being associated with a housing of the control device or the interface being presented via a network to a user device.

12. The computer program product of claim 9, wherein identifying one or more smart device systems associated with the user further comprises identifying one or more smart devices within a same building or room as the control device by identifying a geographic location of a project using GPS and identifying transmitting signals associated with smart device systems from within the geographic location.

13. The computer program product of claim 9, wherein the triggering event is identified based on a communication from the one or more smart device systems to the control device identifying a maintenance or material requirement for a product associated with the one or more smart device systems.

14. The computer program product of claim 9, wherein the third party is a materials provider, maintenance provider, insurance provider, or warrantee provider providing service to a product associated with the one or more smart device systems.

15. The computer program product of claim 9, wherein the one or more smart device systems further comprise products or machinery with transmitting signals associated with the product or machinery capable of transmitting a status and use of the product or machinery.

16. The computer program product of claim 9, wherein selective releasing data from the one or more smart device systems further comprises releasing a first data packet of information about a smart device system from the control device through a portal to a first third party system and releasing a different second data packet of information about the smart device system from the control device through a portal to a second third party system, wherein the data packets are generated based on the type of entity associated with the third party system.

17. A computer-implemented method for aggregation and distribution of machine-initiated resources, the method comprising:
  providing a control device and control device housing comprising computing system comprising a computer processing device and a non-transitory computer readable medium, where the computer readable medium comprises configured computer program instruction code, such that when said instruction code is operated by said computer processing device, said computer processing device performs the following operations:
    identifying one or more smart device systems associated with the user;
    generating, via the control device, a communicable linkage with the one or more smart device systems associated with the user;
    blocking, via the control device, external communication to or from the one or more smart device systems via networks other than the generated communicable linkage;
    uplinking the one or more smart device systems to the control device and store the one or more smart device systems information;
    allowing management of the one or more smart device systems from an interface associated with the control device;
    identifying a triggering event occurring, wherein the triggering event is a predetermined event inputted at the interface by the user or control device identified; and
    selective releasing data from the control device regarding one or more smart device systems to one or more third party systems based on the triggering event occurrence.

18. The computer-implemented method of claim 17, wherein blocking, via the control device, external communication to or from the one or more smart device systems via networks other than the generated communicable linkage further comprises transmitting data packets to the one or more smart device systems and store the data packets on the one or more smart device systems, wherein the data packet includes code preventing communication transmissions from the one or more smart device systems to third party systems.

19. The computer-implemented method of claim 17, wherein the one or more smart device systems further comprise products or machinery with transmitting signals associated with the product or machinery capable of transmitting a status and use of the product or machinery.

20. The computer-implemented method of claim 17, wherein selective releasing data from the one or more smart device systems further comprises releasing a first data packet of information about a smart device system from the control device through a portal to a first third party system and releasing a different second data packet of information about the smart device system from the control device through a portal to a second third party system, wherein the data packets are generated based on the type of entity associated with the third party system.

* * * * *